(12) United States Patent
Wei et al.

(10) Patent No.: US 10,309,843 B2
(45) Date of Patent: Jun. 4, 2019

(54) COAXIAL CABLE SENSOR DEVICE FOR DISTRIBUTED STRAIN MEASUREMENT AND SHAPE SENSING APPLICATIONS

(71) Applicant: Rhode Island Board of Education, State of Rhode Island and Providence Plantations, Providence, RI (US)

(72) Inventors: Tao Wei, West Kingston, RI (US); Zhen Chen, Kingstown, RI (US); Gerald Hefferman, Warwick, RI (US)

(73) Assignee: RHODE ISLAND BOARD OF EDUCATION, STATE OF RHODE ISLAND AND PROVIDENCE PLANTATIONS, Providence, RI (US)

( * ) Notice: Subject to any disclaimer, the term of this patent is extended or adjusted under 35 U.S.C. 154(b) by 84 days.

(21) Appl. No.: 15/379,120

(22) Filed: Dec. 14, 2016

(65) Prior Publication Data

US 2017/0191883 A1 Jul. 6, 2017

Related U.S. Application Data

(60) Provisional application No. 62/275,306, filed on Jan. 6, 2016.

(51) Int. Cl.
*G01L 1/00* (2006.01)
*G01L 5/10* (2006.01)
*G02B 6/00* (2006.01)
*H01Q 13/20* (2006.01)

(52) U.S. Cl.
CPC ............. *G01L 1/005* (2013.01); *G01L 5/101* (2013.01); *G02B 6/00* (2013.01); *H01Q 13/203* (2013.01)

(58) Field of Classification Search
CPC .. G01B 7/16; G01L 5/04; G01L 1/246; Y10T 29/53022; Y10T 29/42; G01M 5/0025; G01M 5/0083; G01M 5/0041; H01L 41/087; H01L 41/45; H01L 41/257; Y10S 310/80; G01V 1/208
See application file for complete search history.

(56) References Cited

U.S. PATENT DOCUMENTS

| 3,981,181 | A | * | 9/1976 | Ochiai | G01M 3/045 |
| | | | | | 174/11 R |
| 4,629,925 | A | * | 12/1986 | Booth | H01L 41/087 |
| | | | | | 310/330 |
| 5,410,255 | A | * | 4/1995 | Bailey | G01M 3/165 |
| | | | | | 174/11 R |
| 6,849,799 | B2 | * | 2/2005 | Springer | H01B 11/1847 |
| | | | | | 174/113 C |
| 9,534,937 | B2 | * | 1/2017 | Xiao | G01D 5/35312 |
| 2006/0086197 | A1 | * | 4/2006 | Chen | G01M 5/0025 |
| | | | | | 73/862.451 |

(Continued)

*Primary Examiner* — Lisa M Caputo
*Assistant Examiner* — Brandi N Hopkins
(74) *Attorney, Agent, or Firm* — Barlow, Josephs & Holmes, Ltd.

(57) ABSTRACT

The present disclosure provides a novel distributed coaxial cable strain sensor that can measure a strain profile over the entire length of a cable. Individual strain sensing elements are constructed using Fabry-Perot interferometers, coaxial cable Bragg gratings, or other reflectometry-based sensing structures. By assembling three or more strain sensors together in a bundle, a coaxial cable shape sensing device can be constructed which is capable of accurate three dimensional position measurement.

17 Claims, 12 Drawing Sheets

(56) References Cited

U.S. PATENT DOCUMENTS

| | | | |
|---|---|---|---|
| 2008/0251270 A1* | 10/2008 | Lee | H01B 11/1817 |
| | | | 174/105 R |
| 2009/0226177 A1* | 9/2009 | Woosnam | G02B 6/443 |
| | | | 398/115 |
| 2012/0174676 A1* | 7/2012 | Nyffenegger | G01V 1/186 |
| | | | 73/647 |
| 2012/0272741 A1 | 11/2012 | Xiao | |
| 2013/0319126 A1* | 12/2013 | Lambert | G01D 5/35316 |
| | | | 73/760 |

\* cited by examiner

COAXIAL CABLE SENSOR DEVICE FOR DISTRIBUTED STRAIN MEASUREMENT AND SHAPE SENSING APPLICATIONS

CROSS-REFERENCE TO RELATED APPLICATIONS

This application claims the benefit of earlier filed U.S. Provisional Patent Application No. 62/275,306, filed 6 Jan. 2016, the entire contents of which are incorporated herein by reference.

BACKGROUND OF THE INVENTION (1) Field of the Invention

The instant invention relates to coaxial cable sensor devices for distributed strain measurement, and more particularly to a multiplexed strain sensing system that can be used for shape sensing applications.

(2) Description of Related Art

Waveguide-based sensing devices have increasingly demonstrated their utility in recent years, leading to their expanding adoption in areas previously dominated by more traditional sensing methodologies. This growth is due in large part to the several distinct advantages waveguide-based sensors have over other, earlier methods, including the ease with which such devices can be multiplexed and simultaneously interrogated along a single waveguide structure, thereby allowing for distributed sensing over a substantial distance with high spatial and temporal resolution. Coaxial cable strain sensors have particular advantages that make them uniquely suited to mechanically harsh and otherwise challenging sensing environments that limit or exclude the use of other sensing modalities. Coaxial cables are substantially more mechanically durable than optical fibers, and thus are better suited to applications in which high mechanical stresses or significant bending are encountered.

SUMMARY OF THE INVENTION

The present disclosure provides a novel distributed coaxial cable strain sensor that can measure a strain profile over the entire length of a cable. Individual strain sensing elements are constructed using Fabry-Perot interferometers, coaxial cable Bragg gratings, or other reflectometry-based sensing structures. By assembling three or more strain sensors together in a bundle, a coaxial cable shape sensing device can be constructed which is capable of accurate three dimensional position measurement.

More specifically, the present disclosure provide a novel coaxial cable construction including a plurality of sensing elements, a coaxial cable distributed strain sensor device using the coaxial cable construction, and a coaxial cable shape sensing device constructed from a plurality of the coaxial cable strain sensor devices bundled together.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
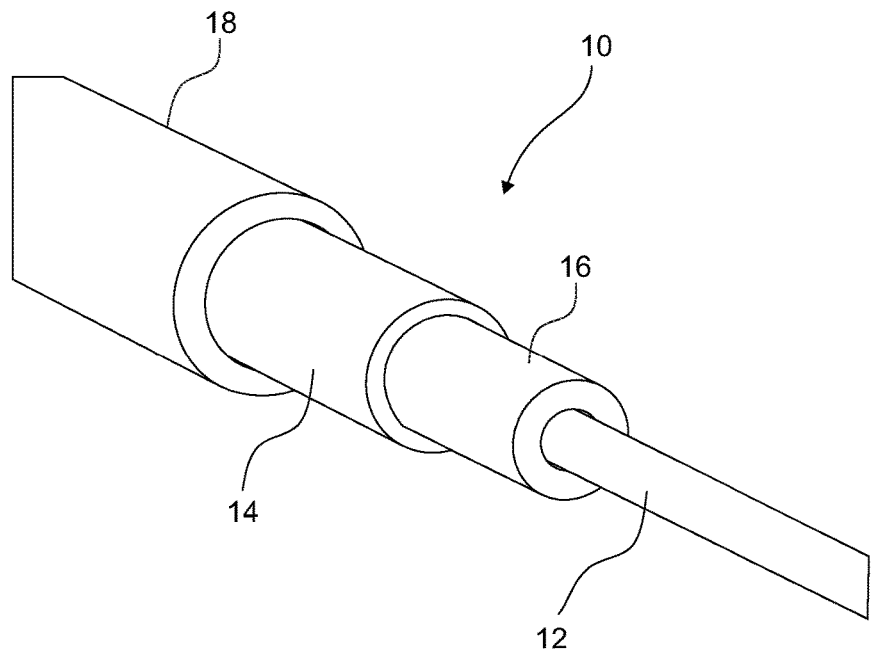
FIG. 1 is a view of an exemplary coaxial cable construction.

Referring now to the drawings, an exemplary embodiment of a coaxial cable is generally indicated at 10 in FIG. 1. The coaxial cable includes an inner conductor 12 extending along the length of the coaxial cable, an outer conductor 14 also extending along a length of the coaxial cable, an insulating material 16 disposed between the inner conductor 12 and the outer conductor 14 and extending along a length of the coaxial cable, and an outer jacket 18. The insulating material 16 is typically made of a flexible material with a relatively high dielectric constant. The outer jacket 18 is typically plastic and generally runs the length of the cable covering the outer conductor 14.

Figure 2A:
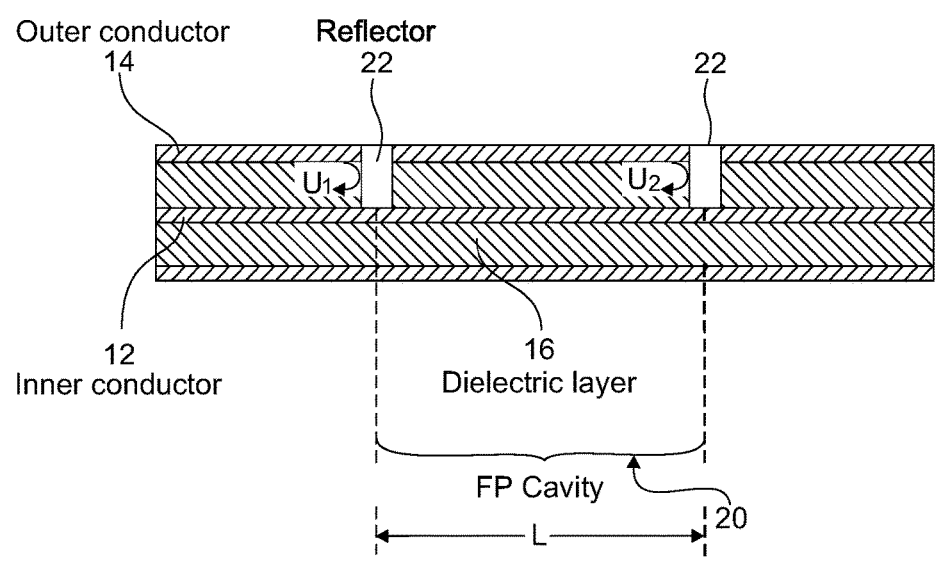
FIG. 2a is a cross-sectional view of a coaxial cable including a Fabry-Perot cavity formed by physical impedance discontinuities.
Figure 4:
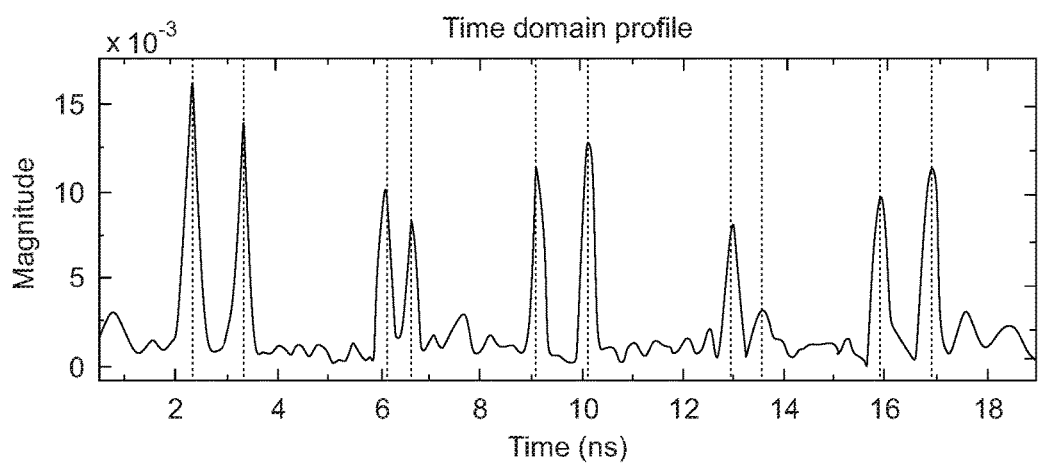
FIG. 4 schematically illustrates an experimental setup combined with a graphical time-domain plot of the CCFPI under testing collected using a vector network analyzer.
Figure 4:
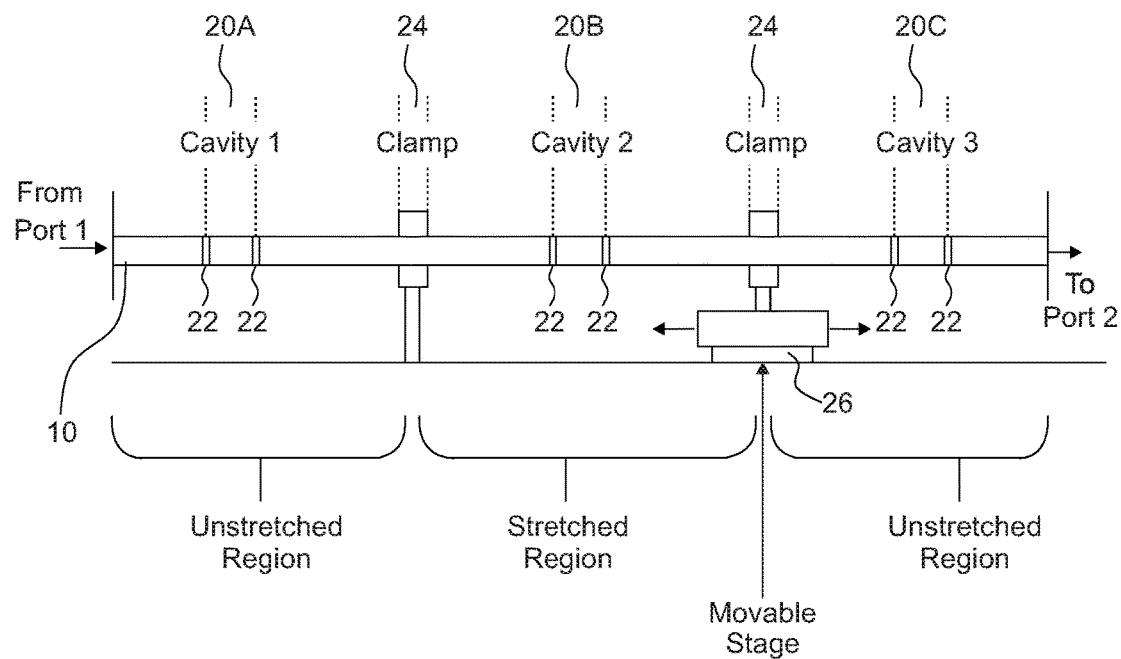

Turning to FIGS. 2a and 4, a coaxial cable 10 for use in distributed strain measurement devices includes a plurality of sensing elements (in this case, Fabry-Perot cavities) 20 (FIG. 4) formed along a length of the coaxial cable. Each of the Fabry-Perot cavities (sensing elements) 20 may have equal or unequal pitch lengths (FIG. 4), and is formed by a pair of spaced reflectors 22 formed in the coaxial cable. Each of the reflectors 22 comprises a physical impedance discontinuity in one or more of the inner conductor 12, the outer conductor 14 and the insulating material 16. In FIG. 2a, the reflector/discontinuity 22 extends only partially through the cable through the outer conductor 14 and the insulating material 16. However, in other embodiments, the reflector/discontinuity (reflector) 22 could pass through the entire diameter of the cable, or be created by compressing the cable along its diameter using a clamping device 24 (See FIG. 4), allowing for tunable levels of reflectivity.

Figure 2B:
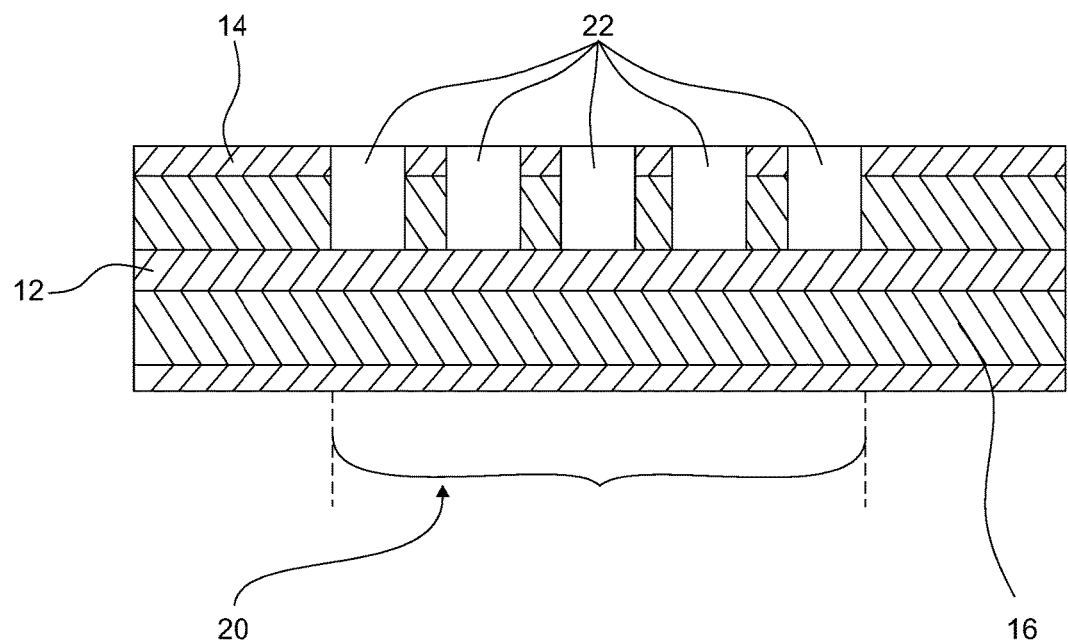
FIG. 2b is a cross-sectional view of a coaxial cable including a Fabry-Perot cavity formed by physical impedance discontinuities.
Figure 2C:
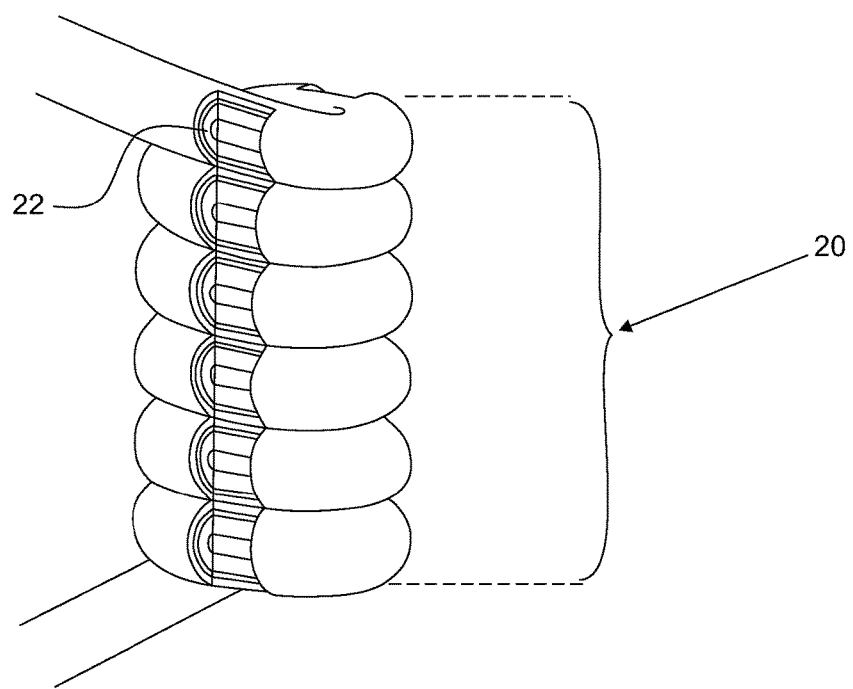
FIG. 2c is an illustration of a coiled coaxial cable resonator (CCCR)

Alternatively, the sensing element 20 can comprise a coaxial cable Bragg grating (see FIG. 2b) having a plurality of spaced discontinuities 22, or a coiled coaxial cable resonator with one or more discontinuities 22 (slots) (FIG. 2c). Other reflectometry-based sensing structures could also be utilized.

Theoretical Modeling

In order to investigate device behavior, a model was first developed (FIG. 2a). In this model, two identically-constructed reflectors 22 are placed along a coaxial cable 10 with a distance L between them. The interference signal of the reflected waves, S, as measured by a vector network analyzer (VNA), can be described as:

$$S = 2\Gamma A \cos\left(\frac{2\pi nL}{v}f\right)\exp\left(j\left(\frac{2\pi nL}{v}f\right)\left(\frac{z_1+z_2}{2}\right)\right)$$

where $\Gamma$ is the reflectivity coefficient, A is the amplitude of the incident wave, n is the refractive index of the inner dielectric material 16, v is the phase velocity, f is the interrogation frequency, j is the imaginary unit, and $z_1$ and $z_2$ are the round-trip path lengths to each of the two reflectors 22, respectively. Since reflectivity varies as a function of frequency, the reflectivity coefficient $\Gamma$ is modeled as $\Gamma$=kf, where k is the reflectivity constant of the reflectors. Since the phase delay introduced by the reflector 22 is small relative to the wavelengths used to interrogate the sensor 20, its contribution to the reflectivity coefficient can be ignored in this model. By using the magnitude of the interference signal, $S_{mag}$, to determine the frequency shift resulting from a change in the distance between the two reflectors 22, the expression can be simplified as:

$$S_{mag} = \left|2kfA\cos\left(\frac{2\pi nL}{v}f\right)\right|$$

further justifying the simplification in which the phase delay introduced by the reflectors 22 is not included in the model. Changes in the length between the reflectors 22 result in a shift in the angular frequency of the interference signal—thus, shifts in $S_{mag}$ relate directly to length changes in the coaxial cable 10 and are therefore used to calculate strain change.

During experimental observation of the CCFPI device 10, a vector network analyzer (Agilent N3383A PNA Series) (not shown) was used to interrogate the CCFPI sensor array (FIG. 4). 1601 linearly-spaced frequencies from 4.9969 MHz to 8.0 GHz were sampled using an interrogation frequency of 10.0 KHz. The gathered frequency data was then converted to the time domain using an inverse Fourier transform. A Hamming window with a 3 ns span and centered between two reflectors was then applied as a gating function to the time domain signal as a means of isolating a cavity (20A, 20B, 20C) of interest. The gated time domain data was then converted to the frequency domain using a Fourier transform. A second-order polynomial curve was fitted to peaks in the resulting frequency spectra and shifts in these peaks were then used as the means of measuring strain changes for the cavity. By shifting the position of the gating function in time domain, different cavities (20A, 20B, 20C) can be interrogated individually, allowing cavities of the same pitch length to be multiplexed along the length of the coaxial cable 10 under test.

During evaluation of the theoretical model, 1601 linearly-spaced frequency values were used between 4.9969 MHz and 8.0 GHz, the reflectors 22 were positioned 10 cm apart, the refractive index of the cable set to 1.5, and the reflectivity constant set to $2.5\times10^{-12}$.

Figure 3:
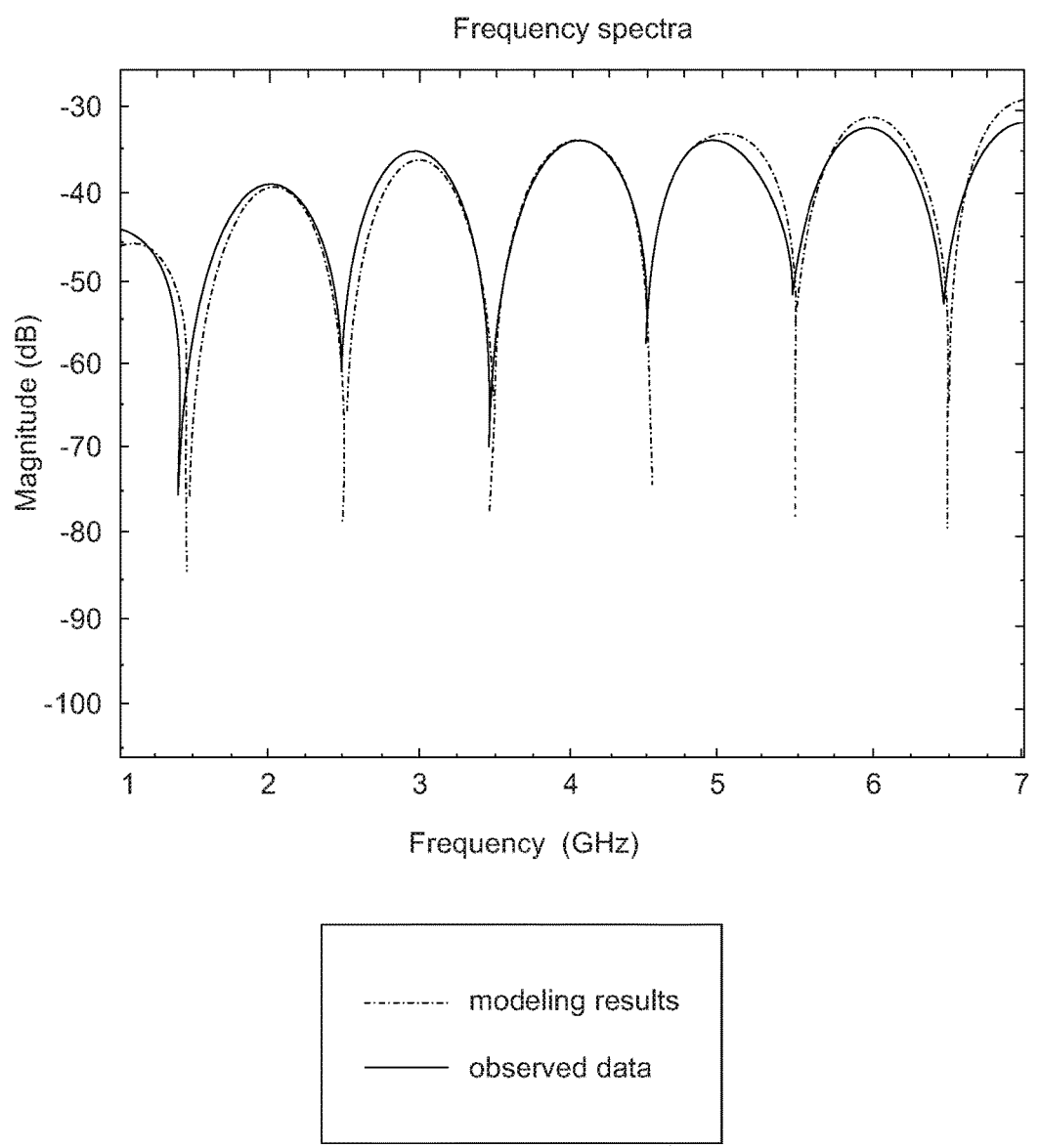
FIG. 3 is a frequency spectra of a coaxial cable Fabry-Perot cavity generated using theoretical modeling and collected using a vector network analyzer.

FIG. 3 compares simulated results using the abovementioned model to experimentally observed device behavior for a CCFPI fabricated as described below (FIG. 4). These results demonstrate that the theoretical model provides a useful estimate of CCFPI device physics.

Experimental Results

In order to experimentally investigate the behavior of the CCFPI sensors 20, a sensor array was constructed and a series of strain tests performed (See FIG. 4). The CCFPI reflectors 22 were fabricated by placing a steel pin 1.15 mm in diameter radially through the diameter of the coaxial cable 10. After the pin was removed, a discontinuity in the coaxial cable remained, resulting in a reflection at that point. This fabrication technique was repeated at regular intervals along the coaxial cable 10, resulting in a series of 6 reflectors forming 3 cavities (20A, 20B, 20C), each with a pitch length of 10 cm and spaced at ~66 cm intervals.

The experimental setup used for strain testing is illustrated in FIG. 4. Once fabrication of the reflectors 22 was competed, the one section of the CCFPI was clamped 24 to a fixed position on an optical bench while a second section was secured to a single axis moveable stage 26 (Newport TS100 DC) controlled using a motion controller/driver (Newport ESP300) with a resolution of 1.0 μm. The cable 10 was secured to allow the second (20B) of the three Fabry-Pérot cavities (20A, 20B, 20C) to be within the cable region to be stretched, while the other two cavities (20A and 20C) remained unstretched. This configuration allowed cross-talk between the cavities in the stretched and unstretched sensing regions to be investigated. The stage 26 was then moved in a series of 10 steps, each 100 μm in length, for a total travel of 1.0 mm. The total length between the two secured points was 585 mm; thus, each step corresponded to a strain change, 171 ρε, resulting in a total strain change of 1.710 mε over the travel of the stage. Twenty (20) measurements were taken at each step interval, and the mean and standard deviation of the observed frequency shifts calculated for each position. The test was repeated six (6) times; three (3) tests stretched the cable under test, while three (3) other tests returned the cable to its original length. These repeated stretching and relaxation cycles allowed repeatability to be investigated.

Figure 5:
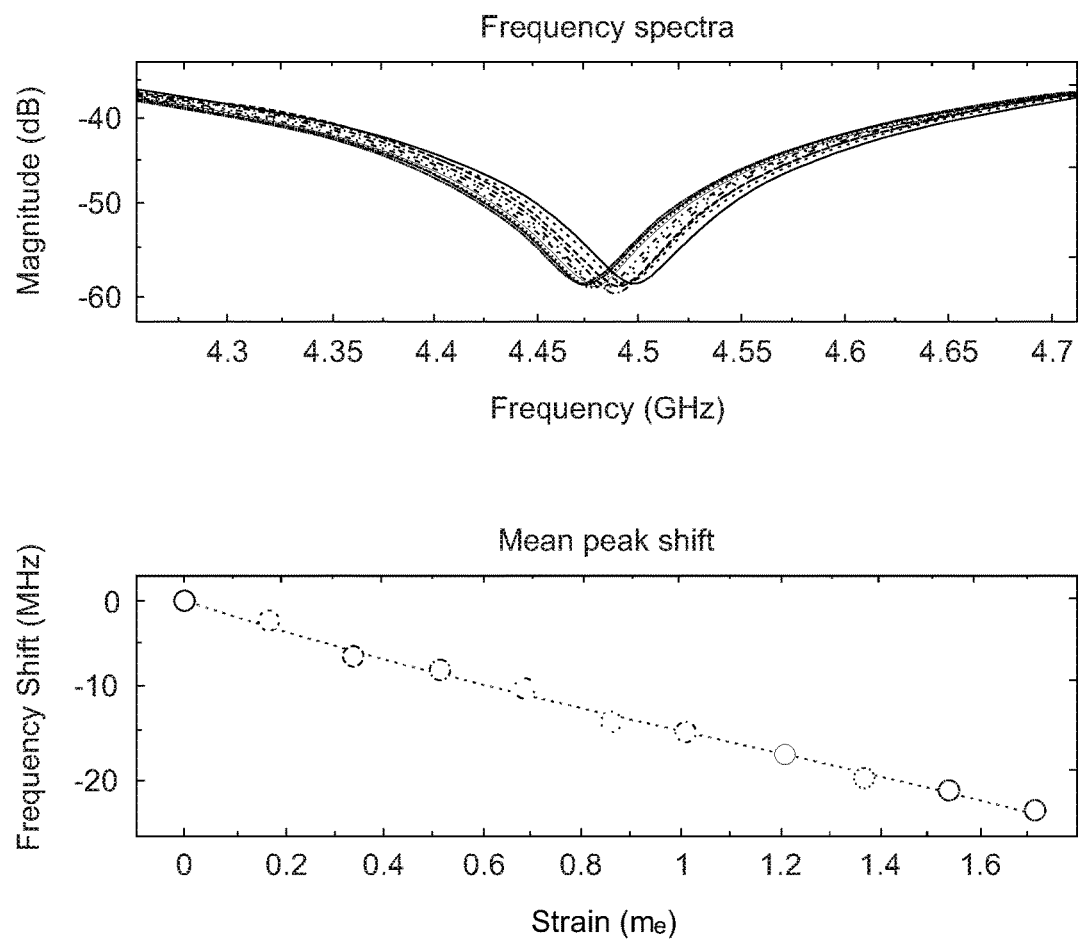
FIG. 5 graphically illustrates a frequency spectra of Cavity 2 during one stretching cycle combined with the observed frequency shifts as a function of strain at each stretching increment.

The results of one stretching cycle are shown in FIG. 5. In this cycle, a Fabry-Pérot cavity, illustrated as cavity 2 (20B) in FIG. 4, was stretched as described above. Twenty (20) spectra were recorded at each stretching increment, and the mean values of the observed peak shifts calculated. A best-fit trend line was applied to these mean values, which had an $R^2$ value of 0.9935 and a slope of −13.95 MHz/mε. These results demonstrate that a linear relationship was observed between strain applied along the stretched cable region and the resulting mean frequency shift.

Figure 6:
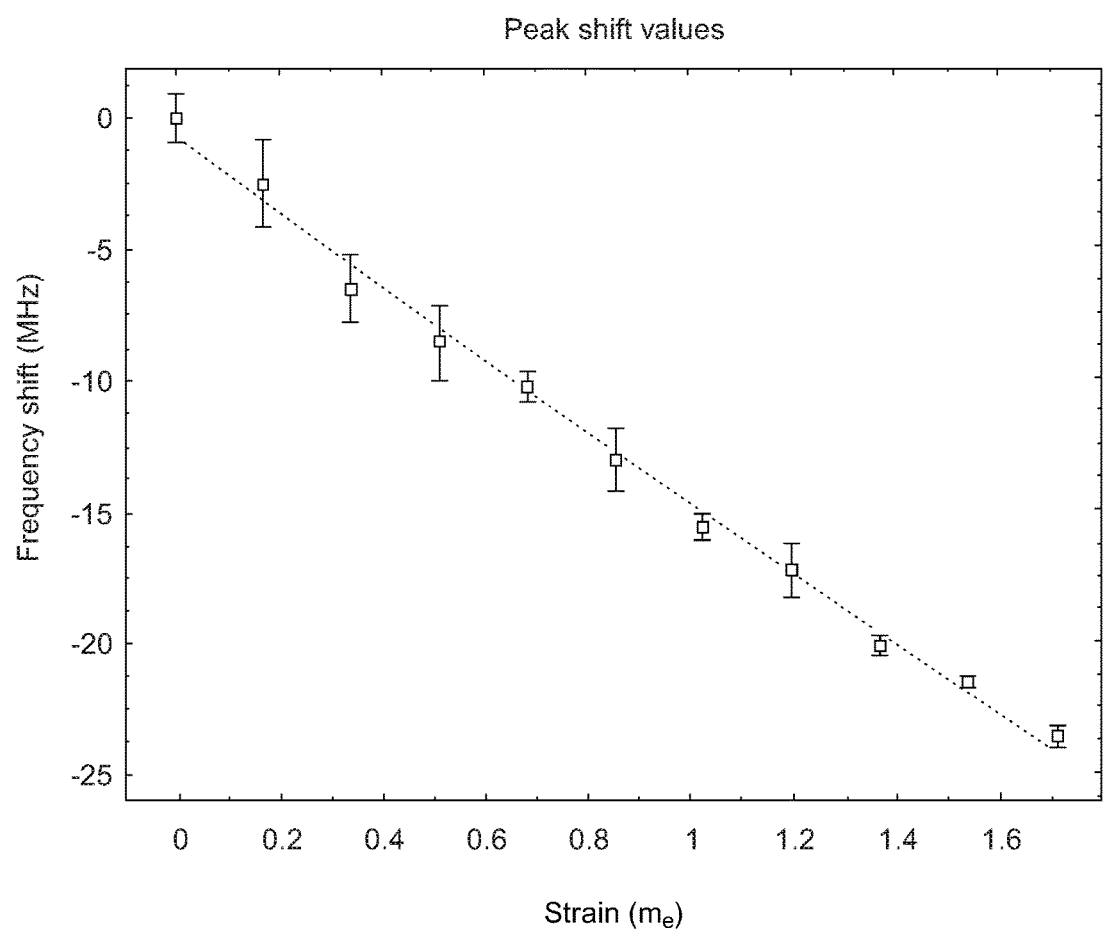
FIG. 6 shows the mean and standard deviation of observed frequency shifts of cavity 2 as a function of strain at each stretching increment over 6 stretching and relaxing cycles.

In order to investigate the repeatability of the CCFPI sensor system, the cable was stretched three (3) times and returned to its original length, or relaxed, three (3) times, allowing for the collection of six (6) sets of twenty (20) spectra at each strain value. The results of this repeatability testing are shown in FIG. 6, which depicts the mean and standard deviation of the mean frequency shift values for the six (6) stretching and relaxing cycles at each of the strain values tested. The greatest standard deviation between mean peak values measured was 1.689 MHz, observed at 0.171 mε, while the smallest standard deviation was 0.2199 MHz at 1.539 mε. A best-fit trend line applied to the mean of the six (6) mean values at each strain position had an $R^2$ value of 0.9933 and a slope of −13.74 MHz/me, demonstrating that strain measurement results have substantial repeatability and linearity across multiple stretching and relaxing cycles.

Figure 7:
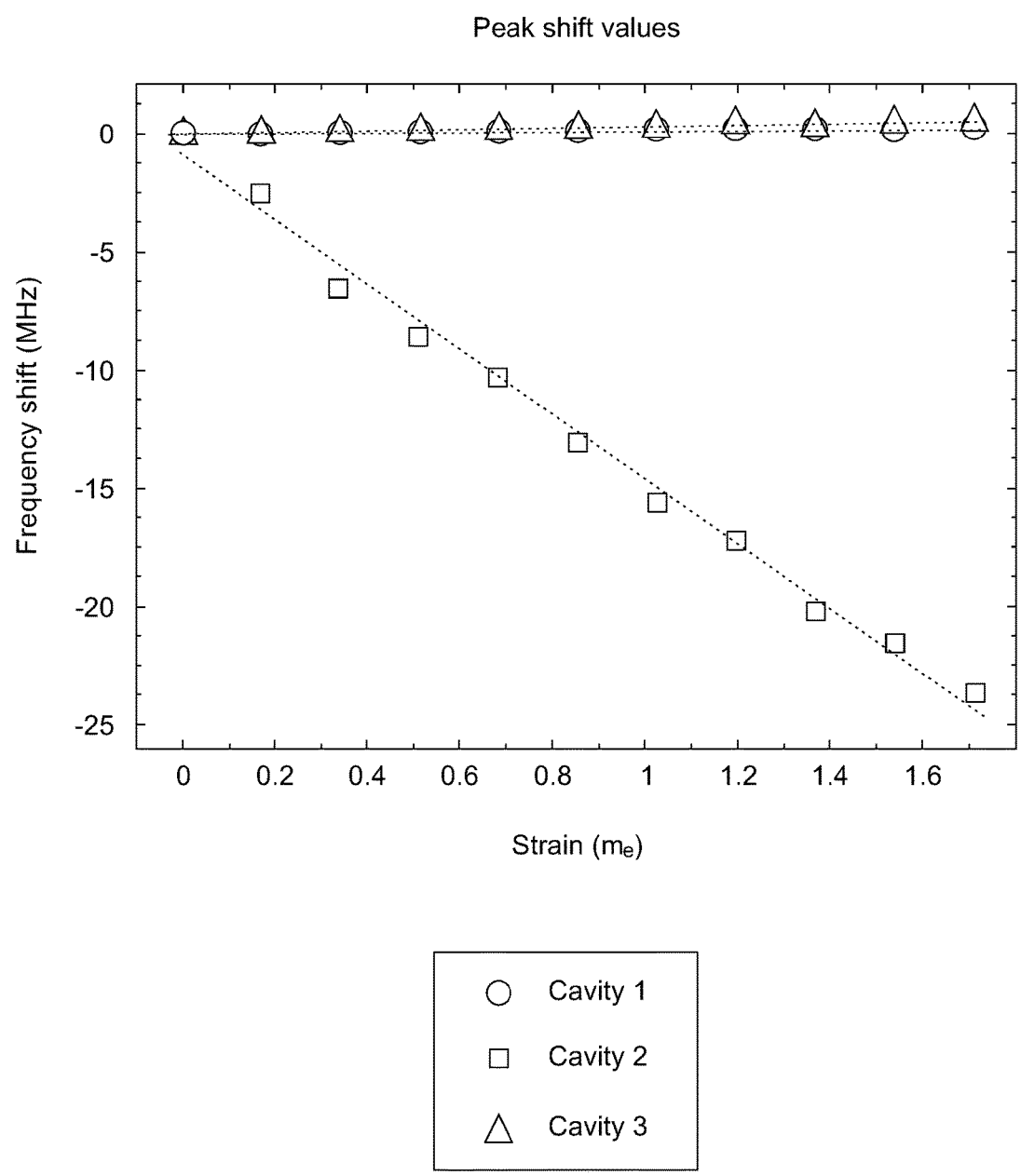
FIG. 7 shows the mean observed frequency shifts of cavities 1, 2, and 3 as a function of strain at each stretching increment over 6 stretching and relaxing cycles.

Crosstalk between CCFPI sensors (20A, 20B, 20C) on a single line was investigated by conducting the strain testing described above to cavity 2 (20B) while leaving cavities 1 (20A) and 3 (20C) unchanged during testing. The results of this testing are shown in FIG. 7. Best fit lines applied to unstretched cavities 1 (20A) and 3 (20C) had slopes of 0.1240 MHz/me and 0.2653 MHz/me, respectively, while the best fit trend line for stretched cavity 2 (20B) had a slope of −13.74 MHz/me, demonstrating that crosstalk between sensor elements 20A, 20B, 20C is minimal.

Stability testing was also undertaken in order to determine the system-level accuracy of the CCFPI sensor system. One thousand (1000) spectra were sequentially recorded from the CCFPI while strain remained constant along cavity 2 (20B). The standard deviation of the peak shifts of the recorded spectra was 218.6 kHz; using the average sensitivity calculated from the repeated stretching and relaxing measurement cycles of −13.74 MHz/me, the strain detection limit was calculated to be 15.9με.

Exemplary Devices

Figure 8A:
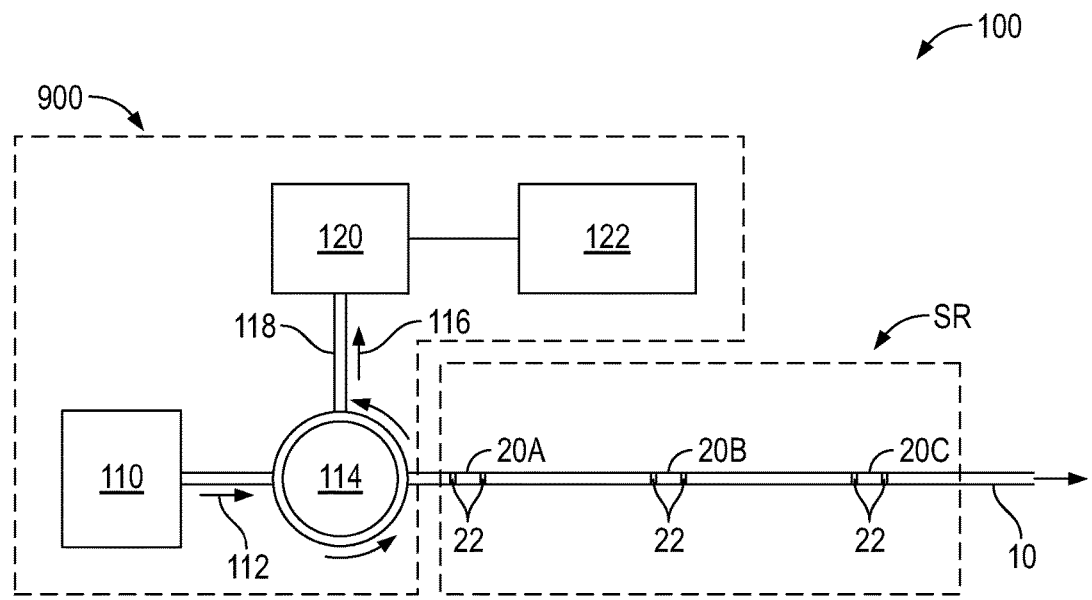
FIG. 8a is a schematic view of a coaxial cable sensor device in accordance with the invention.

Turning now to FIG. 8a, a coaxial cable strain sensor device 100 for distributed strain measurement comprises a coaxial cable 10 including an inner conductor 12 extending along a length of the coaxial cable, an outer conductor 14 extending along a length of the coaxial cable, an insulating material 16 disposed between the inner conductor 12 and the outer conductor 14 and extending along a length of the coaxial cable, and a plurality of sensing elements 20 formed along the length of the coaxial cable 10. In order to provide a strain profile for the entire cable, the sensing elements 20 are repeated n times along the entire length of the cable 10 and identified in Figures as a sensing region (SR). The sensing elements 20 are interrogated by a frequency domain interrogation device 900 configured and arranged to generate a source signal effective to individually interrogate each of the plurality of Fabry-Perot cavities 20, to measure strain changes at each of the cavity locations and to provide a strain profile for the entire coaxial cable 10. As described above, by shifting the gating function in time domain, different sensing elements 20 can be interrogated individually, allowing a plurality of sensing elements 20 to be multiplexed along the entire length of the cable 10 and allowing the cavities to be both of identical or a plurality of pitch lengths. In FIG. 8A, the sensing elements 20 are interrogated in reflection mode by interrogation device 900. An RF source 110 sends a frequency-swept signal 112 through a circulator/splitter 114 to the cascaded sensors 20. A reflection signal 116 bounces back from each sensor cavity 20 and is split by a circulator/splitter 114 to a separate reflection output 118. A RF detector 120 receives the reflection signal 16, and is in turn connected to a circuit 122 which, based on the reflection signal 116, calculates strain at each sensor 20 using the methodologies described above.

Figure 8B:
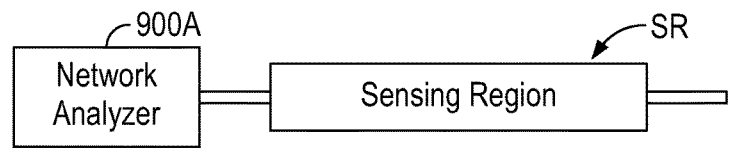
FIGS. 8b-8d are schematic views of alternate interrogation approaches.
Figure 8C:
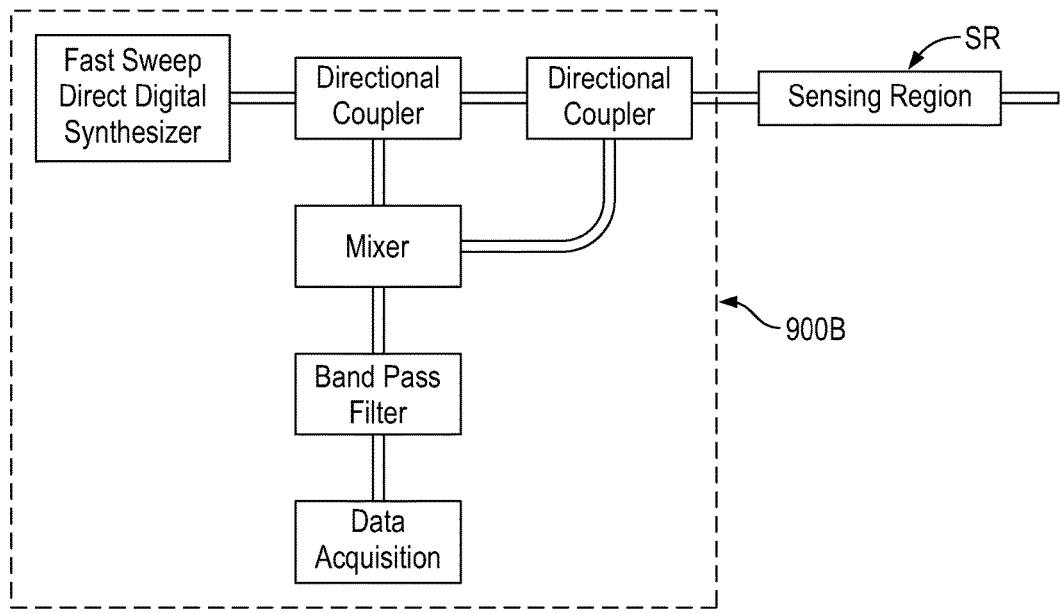
Figure 8D:
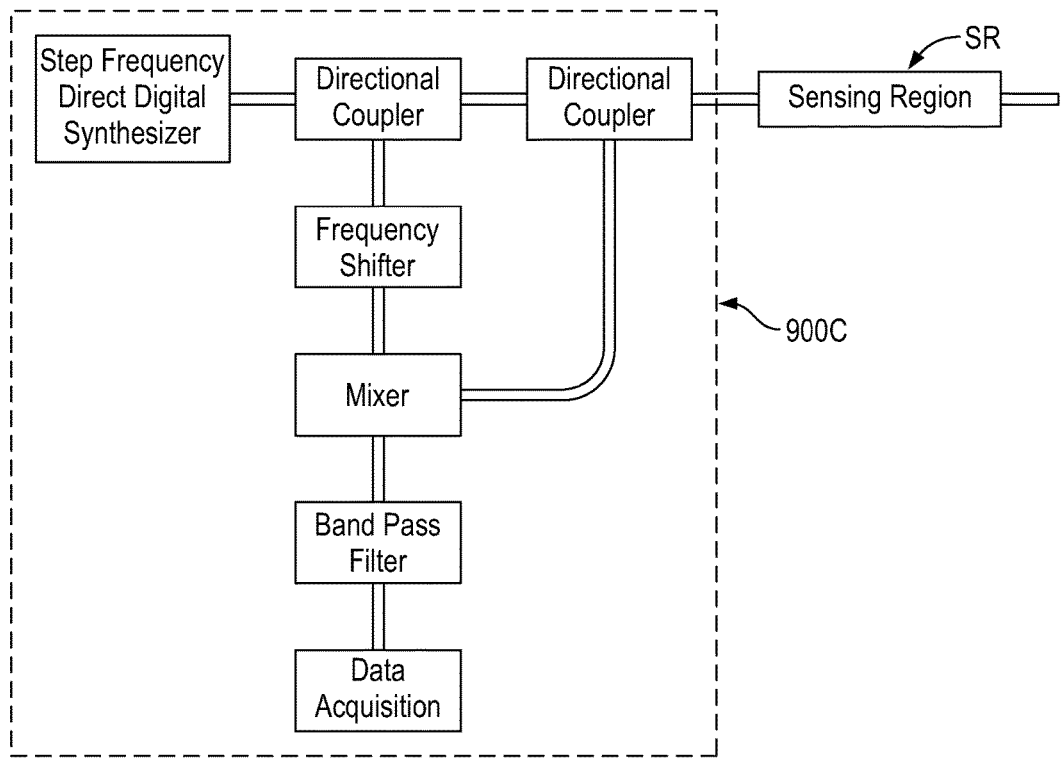

FIGS. 8b-8d illustrate alternate interrogation approaches and interrogation devices 900A, 900B, 900C. It should be understood that a variety of otherwise undescribed interrogation techniques and approaches can also be used effectively within the scope of the present invention.

Figure 9:
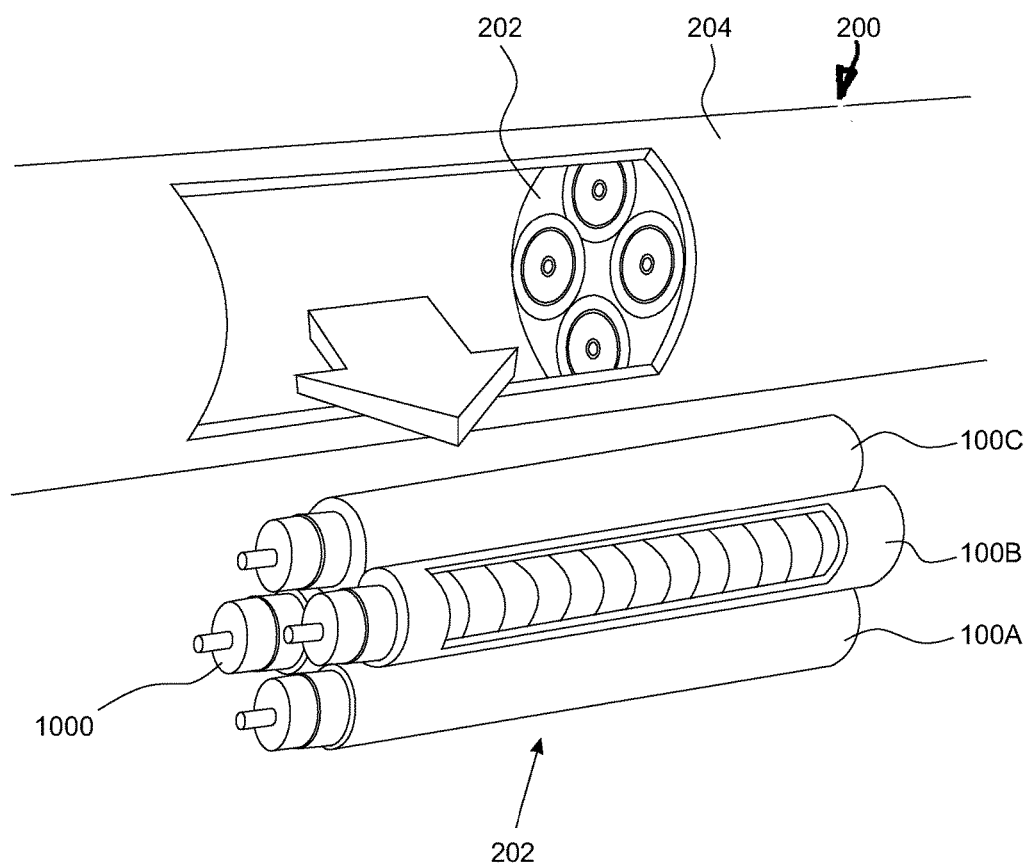
FIG. 9 is a plan view of a coaxial cable shape sensor device in accordance with the present invention.
Figure 10:
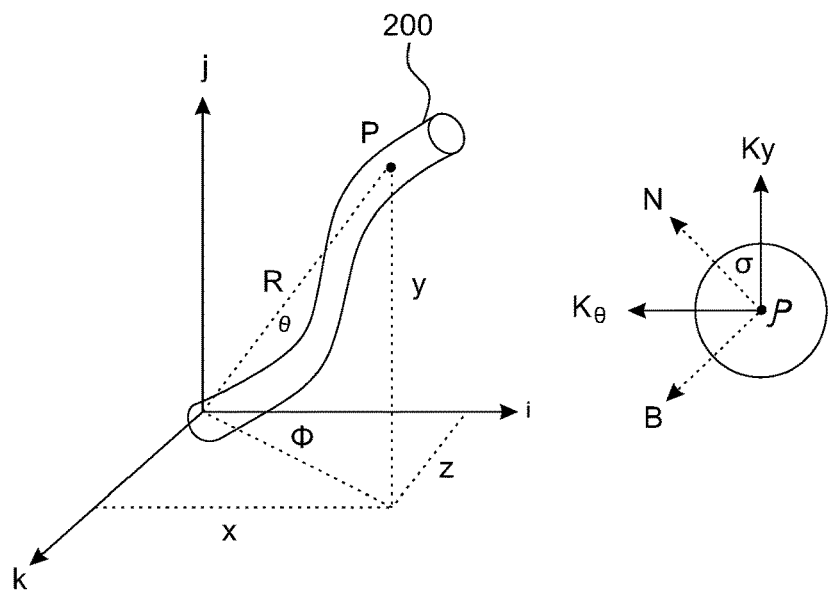
FIG. 10 is a graphical view showing a plot of 3D points to establish a shape profile of the shape sensing cable bundle.
Figure 11:
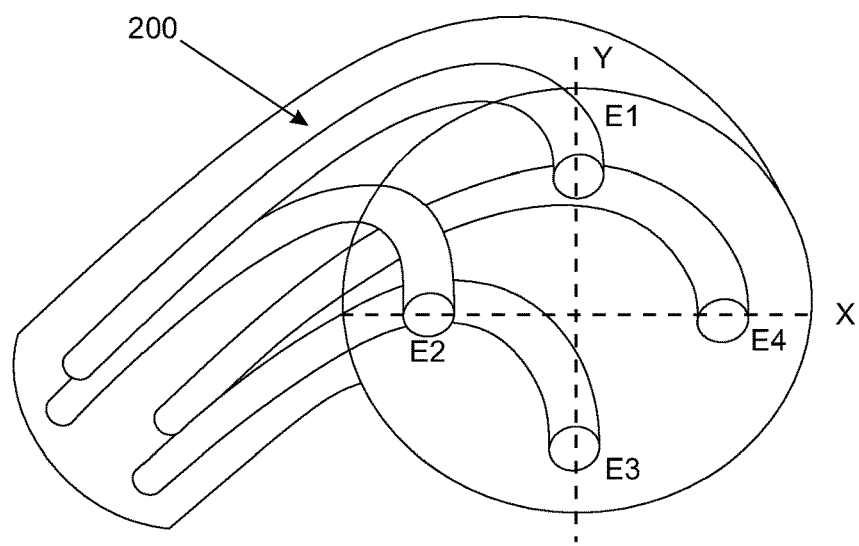
FIG. 11 is another graphical view showing combination of the sensed cavity points to establish a shape profile of the shape sensing cable bundle.

Turning now to FIGS. 9-11, a coaxial cable shape sensor device is illustrated and generally indicated at 200. As described above, a distributed coaxial cable sensor 100 (FIG. 8) measures the strain profile over the entire length of the cable 10. By assembling three (3) or more cable strain sensors 100 together in a bundle, a coaxial cable shape sensor device 200 is created which is capable of accurate three-dimensional (3D) position measurement. Shape change along a coaxial cable shape sensor device 200 results in differing strain changes, known as directional strain change, along the plurality of cable sensors 100. The exemplary embodiment shows four (4) cables in a single bundle. However, the number n may be varied. The bundle 202 may further include an outer jacket 204.

With directional strain profiles, the position and orientation at each of the points (sensors 20) ($\varepsilon_1, \varepsilon_2, \ldots$) (see FIG. 11) along each of the sensing devices 100 can be calculated, allowing the shape of the cable bundle 202 to be reconstructed (FIG. 10).

A coaxial cable shape sensing device 200 comprises a plurality of coaxial cable strain sensor devices 100 extending in parallel, adjacent relation to form a shape-sensing bundle 202. Each of the coaxial cable strain sensor devices 100 are as described hereinabove. Using the strain profiles from each of the plurality of cable sensors 100, a shape-sensing circuit (not shown) receives the multiple strain profiles and constructs a three-dimensional shape profile of the shape-sensing bundle 202.

Figure 12:
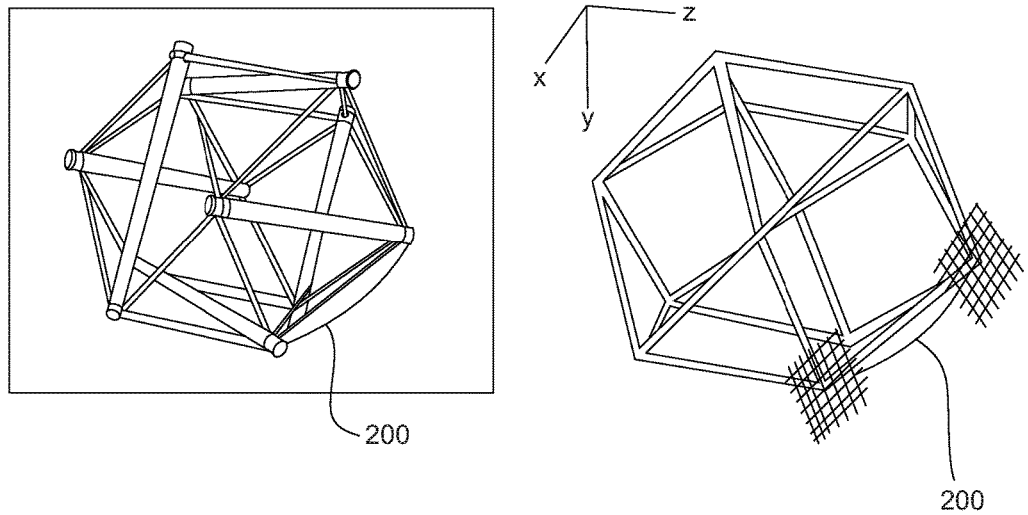
FIG. 12 is a pictorial view of an exemplary use of the shape sensing cable in a flexible tensegrity structure.
Figure 13:
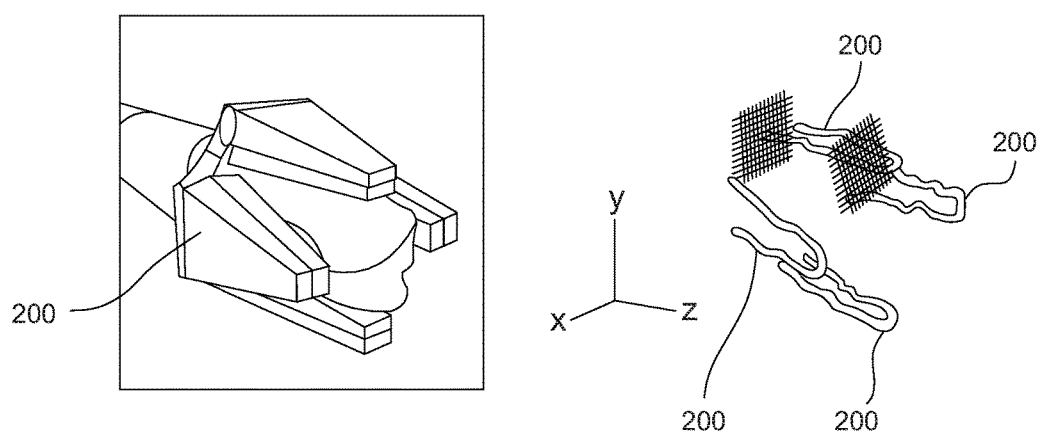
FIG. 13 is a pictorial view of another exemplary use of the shape sensing cable device in a robotic grasper.

As illustrated in FIGS. 12 and 13, the coaxial cable shape sensor device 200 can be mounted on flexible tensegrity structures (FIG. 12), or embedded within compliant materials to monitor the shape of soft machine structures (FIG. 13), such as non-dexterous graspers and actuated cable structures.

It can therefore be seen that the exemplary embodiments provide a unique and novel advancement which has substantial potential as a distributed strain sensor system and shape sensor modality.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A coaxial cable strain sensor device for distributed strain measurement comprising:

a coaxial cable including an inner conductor extending along a length of the coaxial cable, an outer conductor extending along a length of the coaxial cable, an insulating material disposed between the inner conductor and the outer conductor and extending along a length of the coaxial cable, and a plurality of sensing elements formed along the length of the coaxial cable, wherein each of said sensing elements comprises one or more reflectors formed in said coaxial cable, and wherein each of said reflectors comprises a physical impedance discontinuity in one or more of said inner conductor, said outer conductor and said insulating material; and a frequency domain interrogation device configured and arranged to interrogate each of said plurality of sensing elements and to measure strain changes in each of said plurality of sensing elements to provide a strain profile for said coaxial cable, wherein said sensing elements are interrogated in reflection mode, and said frequency domain interrogation device includes a frequency swept RF signal source.

2. The coaxial cable strain sensor device of claim 1, wherein each of said sensing elements is selected from the group consisting of Fabry-Perot cavities, coaxial cable Bragg gratings, coiled coaxial cable resonators, and other reflectometry-based sensing structures.

3. The coaxial cable strain sensor device of claim 2 wherein each of said sensing elements comprises a Fabry-Perot cavity formed by a respective pair of spaced reflectors formed in the coaxial cable.

4. The coaxial cable strain sensor device of claim 3 wherein each of said Fabry-Perot cavities are of equal or unequal length.

5. The coaxial cable strain sensor device of claim 2 wherein each of said sensing elements comprises a coaxial cable Bragg grating formed by a plurality of spaced reflectors formed in the coaxial cable.

6. The coaxial cable strain sensor device of claim 1 wherein the frequency swept RF signal source comprises a fast-sweep direct digital synthesizer.

7. The coaxial cable strain sensor device of claim 1 wherein the frequency swept RF signal source comprises a step-frequency direct digital synthesizer.

8. A coaxial cable shape sensing device comprising:

a plurality of coaxial cable strain sensor devices extending in parallel, adjacent relation to form a shape-sensing bundle, each of said coaxial cable strain sensor devices comprising a coaxial cable including an inner conductor extending along a length of the coaxial cable, an outer conductor extending along a length of the coaxial cable, an insulating material disposed between the inner conductor and the outer conductor and extending along a length of the coaxial cable, and a plurality of sensing elements formed along the length of the coaxial cable, wherein each of said sensing elements comprises one or more reflectors formed in the coaxial cable, and wherein each of said reflectors comprises a physical impedance discontinuity in one or more of said inner conductor, said outer conductor and said insulating material; and a frequency domain interrogation device configured and arranged to interrogate each of said plurality of sensing elements and to measure strain changes in each of said plurality of sensing elements to provide a strain profile for said coaxial cable, wherein said sensing elements are interrogated in reflection mode, and said frequency domain interrogation device includes a frequency swept RF signal source; and a shape-sensing device configured and arranged to receive said strain profile from each of said plurality of coaxial cable sensor devices and to provide a three-dimensional shape profile of said shape-sensing bundle.

9. The coaxial cable shape sensing device of claim 8, wherein each of said sensing elements is selected from the group consisting of Fabry-Perot cavities, coaxial cable Bragg gratings, coiled coaxial cable resonators, and other reflectometry-based sensing structures.

10. The coaxial cable shape sensing device of claim 9 wherein each of said sensing elements comprises a Fabry-Perot cavity formed by a respective pair of spaced reflectors formed in the coaxial cable.

11. The coaxial cable shape sensing device of claim 10 wherein each of said Fabry-Perot cavities are of equal or unequal length.

12. The coaxial cable shape sensing device of claim 9 wherein said plurality of coaxial cable sensor devices comprises three or more sensor devices.

13. The coaxial cable shape sensing device of claim 8 wherein each of said sensing elements comprises a coaxial cable Bragg grating formed by a plurality of spaced reflectors formed in the coaxial cable.

14. The coaxial cable shape sensing device of claim 8 further comprising an outer jacket surrounding said shape-sensing bundle.

15. The coaxial cable shape sensing device of claim 8 wherein said plurality of coaxial cable sensor devices comprises three or more sensor devices.

16. The coaxial cable shape sensor device of claim 8 wherein the frequency swept RF signal source comprises a fast-sweep direct digital synthesizer.

17. The coaxial cable shape sensor device of claim 8 wherein the frequency swept RF signal source comprises a step-frequency direct digital synthesizer.

* * * * *